Aug. 18, 1953      G. H. COOK      2,649,025
OPTICAL OBJECTIVE OF VARIABLE FOCAL LENGTH
Filed Sept. 6, 1951
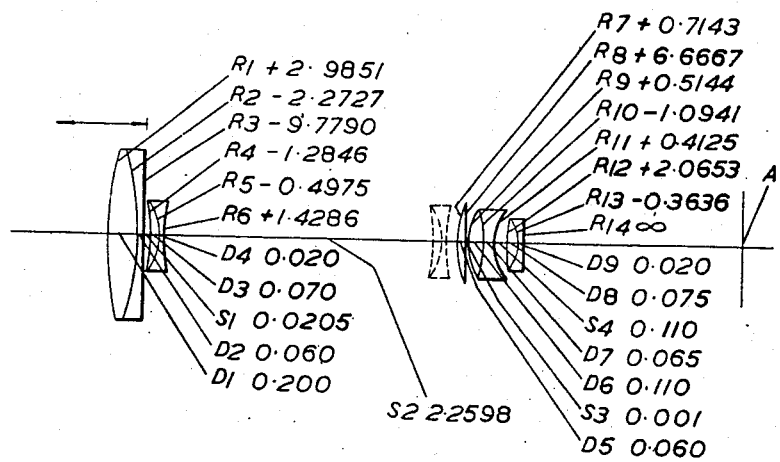
Inventor
GORDON HENRY COOK
By
Emery, Holcombe & Blair
Attorney Patented Aug. 18, 1953

2,649,025

UNITED STATES PATENT OFFICE 2,649,025

OPTICAL OBJECTIVE OF VARIABLE FOCAL LENGTH

Gordon Henry Cook, Leicester, England, assignor to Taylor, Taylor & Hobson Limited, Leicester, England, a British company Application September 6, 1951, Serial No. 245,297
In Great Britain September 22, 1950

33 Claims. (Cl. 88—57)

This invention relates to an optical objective for photographic or other purposes, having relatively movable members, whereby the equivalent focal length of the objective can be varied at will, whilst maintaining good correction for the various aberrations.

Desirable features in such an objective include a wide range of continuously variable focal lengths, constant focussing position throughout the range, constant relative aperture throughout the range at any setting of the diaphragm, a short distance from front vertex to focal plane, simplicity of construction to minimise loss of light by absorption and reflection and also to reduce weight, and focussing for near objects independent of focal length.

The present invention has for its object to provide an improved variable focus objective wherein all these desirable features can be attained.

The objective according to this invention comprises an axially movable divergent member located in front of a stationary convergent rear member and behind an axially movable convergent front member, wherein in each operative position the equivalent focal length of the divergent combination of the front two members bears to that of the complete objective a ratio between 8 and 13 times the reciprocal of the f/number of the objective, the virtual image of a distant object formed by such divergent combination having a constant axial position relatively to the stationary rear member throughout the range of variation of the equivalent focal length of the objective, the complete objective being corrected for spherical and chromatic aberrations, coma, astigmatism, field curvature and distortion throughout the range of variation.

It should be made clear that the terms "front" and "rear" are herein used in accordance with the usual convention to relate to the sides of the objective respectively nearer to and further from the longer conjugate.

The equivalent focal length $f_3$ of the stationary rear member preferably lies between $F_0$ and $\sqrt{F_1 F_m}$, where $F_0$ and $F_m$ are respectively the lower and upper limits of the range of variation of the equivalent focal length of the complete objective. The ratio of the equivalent focal length $f_1$ of the convergent front member to that $f_2$ of the divergent second member preferably lies between 1.0 and 1.2 times the value of the expression $(1+\sqrt{F_m/F_0})$.

Conveniently, the diameters of the front two members are made larger than is necessary to accommodate the full axial beam, so that the relative aperture of the objective is determined solely by the stationary rear member and the diaphragm located in or near such member, and therefore remains constant throughout the range of variation.

Focussing for near objects is preferably effected by axial movement of the convergent front member independently of the second and third members.

In a preferred practical arrangement, designed for a range of variation of the equivalent focal length of the objective of 5:1 (that is $F_m=5 F_0$), the ratio $f_3/F_0$ conveniently lies between one-third and one-sixth of the f/number of the objective. In this case $f_2$ may lie between $1.06$ and $1.44 F_0$, and $f_1$ between $3.43 F_0$ and $5.59 F_0$.

The convergent front member may consist of a doublet, chromatically but not otherwise corrected, the internal contact surface in such doublet being dispersive and concave to the front.

The divergent second member may likewise consist of a doublet, chromatically but not otherwise corrected, the internal contact surface in this doublet being collective and concave to the front.

The stationary rear member may consist of a divergent component located behind a convergent simple front component and in front of a convergent rear component. Such convergent rear component may consist of a doublet having a collective internal contact surface concave to the front with radius of curvature less than $F_0$, the difference between the mean refractive indices of the materials of the two elements of such doublet lying between .05 and .12. The divergent middle component of the rear member may consist of a doublet having a convergent element and a divergent element, and such doublet may be of meniscus form with its outer surfaces convex to the front, its internal contact surface being dispersive and concave to the front.

A convenient practical example of variable focus objective according to the invention is illustrative diagrammatically in the accompanying drawing and numerical data therefor are given in the following table, in which $R_1 R_2 \ldots$ represent the radii of curvature of the individual surfaces counting from the front, the positive sign indicating that the surface is convex to the front and the negative sign that it is concave thereto, $D_1 D_2 \ldots$ represent the axial thicknesses of the various elements, and $S_1 S_2 \ldots$ represent the axial air separations between the components, the table also giving the mean refractive index $n_D$ for the D-line and the Abbé V number of the material used for each element.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primarly aberrations, but different mathematical sign conventions are required for other purposes including computation of some of the secondary aberrations, so that a radius indicated for example as positive in the tables may have to be treated as negative for some calculations as is well understood in the art.

[Equivalent focal length varying from $F_0=1.000$ to $F_m=5.000$.]

| Relative Aperture f/5.6 | | | |
|---|---|---|---|
| Radius | Thickness or Air Separation | Refractive Index $n_D$ | Abbé V Number |
| $R_1 = +2.9851$ | $D_1 = 0.20$ | 1.6121 | 58.6 |
| $R_2 = -2.2727$ | $D_2 = 0.060$ | 1.6987 | 30.4 |
| $R_3 = -9.7790$ | $S_1 = 0.0205$ to $2.2565$ | | |
| $R_4 = -1.2846$ | $D_3 = 0.070$ | 1.6987 | 30.4 |
| $R_5 = -0.4975$ | $D_4 = 0.020$ | 1.6100 | 53.4 |
| $R_6 = +1.4286$ | $S_2 = 2.2578$ to $0.0218$ | | |
| $R_7 = +0.7143$ | $D_5 = 0.060$ | 1.6130 | 59.4 |
| $R_8 = +6.6667$ | $S_3 = 0.001$ | | |
| $R_9 = +0.5144$ | $D_6 = 0.110$ | 1.5481 | 45.7 |
| $R_{10} = -1.0941$ | $D_7 = 0.065$ | 1.6987 | 30.4 |
| $R_{11} = +0.4125$ | $S_4 = 0.110$ | | |
| $R_{12} = +2.0653$ | $D_8 = 0.075$ | 1.6163 | 36.6 |
| $R_{13} = -0.3636$ | $D_9 = 0.020$ | 1.5485 | 45.6 |
| $R_{14} = \infty$ | | | |

In this example, the back focal length from the surface $R_{14}$ to the rear focal plane A of the objective is 1.7 $F_0$. The iris diaphragm is located within the stationary rear member at distance 0.05 $F_0$ behind the surface $R_{11}$ and 0.06 $F_0$ in front of the surface $R_{12}$.

The equivalent focal length $f_1$ of the convergent front member in front of the air space $S_1$ is 4.217 $F_0$. The equivalent focal $f_2$ of the divergent middle member between the air spaces $S_1$ and $S_2$ is 1.250 $F_0$. The equivalent focal length of the convergent stationary rear member behind the air space $S_2$ is 1.384 $F_0$.

The equivalent focal length of the divergent combination of the front two members varies between 1.886 $F_0$ and 9.430 $F_0$. The ratio of this focal length to the equivalent focal length F of the whole objective remains constant throughout the range of variation and is equal to 1.886, which is 10.56 times the reciprocal of the f/number 5.6 of the objective. The ratio $f_1/f_2$ is 3.3736, which is about 1.04 times the expression $(1+\sqrt{F_m/F_0})$, since $F_m/F_0=5$. It will also be noticed that $f_3$ is greater than $F_0$ and less than $\sqrt{F_0 F_m}$, that is $\sqrt{5F_0}$, and also lies between one-third and one-sixth of the f/number 5.6 of the objective.

The semi-angular field covered by the example varies from about 10 degrees at minimum equivalent focal length $F_0$ to about 2 degrees at maximum equivalent focal length $F_m$.

In the position of adjustment giving the lowest value $F_0$ of the equivalent focal length of the objective, the air space $S_1$ between the front two members has its lowest value .0205 $F_0$, whilst the air space $S_2$ between the rear two members has its higest value 2.2578 $F_0$. When the objective is to be adjusted to increase its equivalent focal length, the middle member is moved backwards towards the stationary rear member until in the position of maximum focal length $F_m$ shown in dotted lines the air space $S_2$ has been reduced to 0.0218 $F_0$, and at the same time the air space $S_1$ between the front two members is increased to the maximum value 2.2565 $F_0$. The backward movement of the middle member from its initial position to increase the equivalent focal length F of the objective from its minimum value $F_0=1$ is given by the expression $f_2(F-1)/\sqrt{5}$, and the forward movement of the front member from its initial position is given by the expression $f_2(6-F-5/F)/\sqrt{5}$. It will thus be seen that the front member at first moves forward and then back again, its travel being indicated by the double-headed arrow, returning to its initial position again when F reaches its maximum value $F_m=5$. The most forward position of the front member occurs when $F=\sqrt{5}$. In this way the overall length of the objective is kept short throughout the range of variation.

During these movements the conjugate distances of the middle member (that is the distances from its nodal points of the image of the object formed by the front member and of the virtual image of such image formed by the middle member) vary; the ratio of such conjugate distances being the magnification produced by the middle member. Thus if $M_0$ and $M_m$ are the values of such magnification corresponding respectively to the minimum and maximum focal lengths $F_0$ and $F_m$, then $M_m/M_0 = F_m/F_0$. The arrangement is such that this magnification passes through unity when $F=\sqrt{5}$, so that in fact $M_0 = 1/\sqrt{5}$ and $M_m = \sqrt{5}$.

Since the virtual image of the object formed by the combination of the front two members occupies the same position relatively to the stationary rear member in all positions of adjustment (that is, the algebraic sum of the back focal length of this combination and the separation between the middle member and the rear member remains constant in all positions), the position of the image thereof formed by the stationary rear member likewise remains the same, so that the image plane of the whole objective remains fixed in position throughout the adjustment, the size of the image however increasing as the equivalent focal length increases. The ratio of the maximum image size to the minimum image size is thus equal to $F_m/F_0$, that is 5:1.

In the foregoing description of the movements, it has been assumed that the object position remains unchanged, for example at infinity, and it will be clear that for a fixed object position the resultant image position remains fixed, the effect of the adjustments being to alter the size of the image. If, however, the object position changes, a further adjustment will be necessary in order to retain the same resultant image position for all object positions. This can be simply achieved by an additional movement of the front member independently of the middle and rear members. Taking the position (or rather range of positions) of the front member corresponding to an infinitely distant object as the standard, the necessary further adjustment of the front member for focussing for a near object consists of a forward movement of such member through a distance equal to $f_1^2/(d-f_1)$, where $d$ is the distance of the object in front of the front nodal point of the front member in its position of adjustment. Since this expression is independent of the equivalent focal length F of the whole objective, it will be clear that with each and any additional adjustment of the front member to suit a particular object distance, the main movements to vary the focal length and alter the image size can still be effected without altering the resultant image position. This arises from the fact that in any one position of the middle member, the additional movement of the front member to suit object distance is such that the image of the object formed by the front member always occupies the same position relatively to the middle member. In other words, throughout the whole range of both adjustments, the position of the virtual image of the object formed by the combination of the front two members remains constant relatively to the stationary rear member. The two movements can readily be effected by a suitable mechanism interlinking the movement of the middle member with that of a carriage on which the front member is adjustably mounted.

In order to retain constant relative aperture throughout the range of movements, the diameters of the front two members are made greater than is necessary to accommodate the full axial beam for all settings of the iris diaphragm, which thus alone determines the effective aperture in all positions of adjustment. Thus, in the example, the maximum diameter of the full axial beam in the front member varies from .18 $F_0$ to .9 $F_0$ during the movements, but the actual diameter of this member is made 1.3 $F_0$. The maximum diameter of the axial beam in the middle member varies from .18 $F_0$ to .4 $F_0$, the actual diameter being .53 $F_0$.

The two front members each consist of an achromatic doublet having its internal contact surface concave to the front, such surface being dispersive in the front member and collective in the second member.

The stationary rear member has three components of which the first is simple and convergent, the second is a divergent meniscus doublet consisting of a strong convergent element in front of a relatively weak divergent element, and the third is a convergent doublet. The second component primarily serves to control astigmatism and could, if desired, be replaced by two simple components, one convergent and one divergent.

The example is well-corrected, throughout the range of variation, for the usual primary aberrations and also for zonal coma and zonal spherical aberration. In cases, however, where correction for these secondary aberrations can be sacrificed, the stationary rear member can be simplified by the use of a simple component, instead of a doublet, for its third member. The stationary rear member can be simplified or complicated in cases where different relative apertures and different fields of view have to be covered.

What I claim as my invention and desire to secure by Letters Patent is:

1. An optical objective of variable focal length, corrected for spherical and chromatic aberrations, coma, astigmatism, field curvature and distortion throughout the range of variation, and comprising a stationary convergent rear member having an equivalent focal length $f_3$ lying between $F_0$ and $\sqrt{F_0 F_m}$, where $F_0$ and $F_m$ are respectively the lower and upper limits of the range of variation of the equivalent focal length of the whole objective, an axially movable divergent second member located in front of the rear member, an axially movable convergent front member located in front of the second member, and means for axially moving the front member and the second member whereby in each operative position the equivalent focal length of the divergent combination of such two members bears to that of the complete objective a ratio between 8 and 13 times the reciprocal of the f/number of the objective and the virtual image of a distant object formed by such divergent combination has a constant axial position relatively to the stationary rear member throughout the range of variation of the equivalent focal length of the objective.

2. An optical objective as claimed in claim 1, in which the ratio of the equivalent focal length $f_1$ of the convergent front member to that $f_2$ of the divergent second member lies between 1.0 and 1.2 times the value of the expression $(1+\sqrt{F_m/F_0})$.

3. An optical objective as claimed in claim 2, in which the ratio of the equivalent focal length $f_3$ of the stationary rear member to the value $F_0$ of the equivalent focal length of the complete objective at the lower end of the range of variation thereof lies between one-third and one-sixth of the f/number of the objective.

4. An optical objective as claimed in claim 3, in which the equivalent focal length $f_2$, of the divergent second member lies between 1.06 $F_0$ and 1.44 $F_0$.

5. An optical objective as claimed in claim 1, in which the ratio of the equivalent focal length $f_1$ of the convergent front member to that $f_2$ of the divergent second member lies between 1.0 and 1.2 times the value of the expression $(1+\sqrt{F_m/F_0})$, said objective having means whereby the convergent front member can be moved independently of the other two members for focussing for near objects.

6. An optical objective as claimed in claim 1, in which the diameter of the convergent front member lies between .22 $f_1$ and .36 $f_1$ and that of the divergent second member between .22 $f_2$ and .72 $f_2$, where $f_1$ and $f_2$ are the equivalent focal lengths respectively of the front and second members, such diameters being larger than is necessary to accommodate the full axial beam, so that the relative aperture of the objective is determined solely by the stationary rear member and the diaphragm located in or near such member and therefore remains constant throughout the range of variation.

7. An optical objective as claimed in claim 6, in which the ratio of the equivalent focal length $f_1$ of the convergent front member to that $f_2$ of the divergent second member lies between 1.0 and 1.2 times the value of the expression $(1+\sqrt{F_m/F_0})$.

8. An optical objective as claimed in claim 1, in which the ratio of the equivalent focal length $f_3$ of the stationary rear member to the value $F_0$ of the equivalent focal length of the complete objective at the lower end of the range of variation thereof lies between one-third and one-sixth of the f/number of the objective.

9. An optical objective as claimed in claim 1, in which the convergent front member consists of a doublet, chromatically but not otherwise corrected, the internal contact surface in such doublet being dispersive and concave to the front.

10. An optical objective as claimed in claim 1, in which the divergent second member consists of a doublet, chromatically but not otherwise corrected, the internal contact surface in such doublet being collective and concave to the front.

11. An optical objective as claimed in claim 1, in which the front and second members each consist of a doublet chromatically but not otherwise corrected and having its internal contact surface concave to the front, such surface being dispersive in the front member and collective in the second member.

12. An optical objective of variable focal length, corrected for spherical and chromatic aberrations, coma, astigmatism, field curvature and distortion throughout the range of variation, and comprising a stationary convergent rear member, an axially movable divergent second member located in front of the rear member, an axially movable convergent front member located in front of the second member, means for axially moving the front member and the second member whereby in each operative position the equivalent focal length of the divergent combination of such two members bears to that of the complete objective a ratio between 8 and 13 times the reciprocal of the f/number of the objective and the virtual image of a distant object formed by such divergent combination has a constant axial position relatively to the stationary rear member throughout the range of variation of the equivalent focal length of the objective, the ratio of the equivalent focal length $f_1$ of the convergent front member to that $f_2$ of the divergent second member lying between 1.0 and 1.2 times the value of the expression $(1+\sqrt{F_m/F_0})$, where $F_0$ and $F_m$ are respectively the lower and upper limits of the range of variation of the equivalent focal length of the objective.

13. An optical objective as claimed in claim 12, in which the diameter of the convergent front member lies between .22 $f_1$ and .36 $f_1$ and that of the divergent second member between .22 $f_2$ and .72 $f_2$, such diameters being larger than is necessary to accommodate the full axial beam, so that the relative aperture of the objective is determined solely by the stationary rear member and the diaphragm located in or near such member and therefore remains constant throughout the range of variation.

14. An optical objective as claimed in claim 12, in which the ratio of the equivalent focal length $f_3$ of the stationary rear member to the value $F_0$ of the equivalent focal length of the complete objective at the lower end of the range of variation thereof lies between one-third and one-sixth of the f/number of the objective.

15. An optical objective as claimed in claim 14, in which the equivalent focal length $f_2$ of the divergent second member lies between $-1.06 F_0$ and $-1.44 F_0$.

16. An optical objective as claimed in claim 13, in which the convergent front member consists of a doublet, chromatically but not otherwise corrected, the internal contact surface in such doublet being dispersive and concave to the front.

17. An optical objective as claimed in claim 16, in which the divergent second member consists of a doublet, chromatically but not otherwise corrected, the internal contact surface in such doublet being collective and concave to the front.

18. An optical objective as claimed in claim 17, in which the stationary rear member consists of a divergent component located behind a convergent simple front component and in front of a convergent rear component.

19. An optical objective of variable focal length, corrected for spherical and chromatic aberrations, coma, astigmatism, field curvature and distortion throughout the range of variation, and comprising a stationary convergent rear member, consisting of a divergent component having equivalent focal length between $-.75 f_3$ and $-2.0 f_3$ and located behind a convergent simple component having equivalent focal length between .5 $f_3$ and 1.5 $f_3$ and in front of a convergent rear component having equivalent focal length between .85 $f_3$ and 2.5 $f_3$, where $f_3$ is the equivalent focal length of the whole stationary rear member, an axially movable divergent second member located in front of the rear member, an axially movable convergent front member located in front of the second member, and means for axially moving the front member and the second member whereby in each operative position the equivalent focal length of the divergent combination of such two members bears to that of the complete objective a ratio between 8 and 13 times the reciprocal of the f/number of the objective and the virtual image of the distant object formed by such divergent combination has a constant axial position relatively to the stationary rear member throughout the range of variation of the equivalent focal length of the objective.

20. An optical objective as claimed in claim 19, in which the rear component of the rear member consists of a doublet having a collective internal contact surface concave to the front of radius of curvature less than the minimum value $F_0$ of the equivalent focal length of the whole objective and greater than $F_0$ divided by the f/number of the objective, the difference between the mean refractive indices of the materials of the two elements of such doublet lying between .05 and .12.

21. An optical objective as claimed in claim 20, in which the divergent middle component of the rear member consists of a convergent element in front of a divergent element, the internal contact surface being dispersive and concave to the front and having a radius of curvature between .6 $f_3$ and 1.2 $f_3$, the mean refractive index of the material of the divergent element exceeding that of the convergent element by between .1 and .2.

22. An optical objective as claimed in claim 21, in which the divergent middle component of the rear member consists of a meniscus doublet, whose internal contact surface is concave to the front and whose front outer surface has radius of curvature less than .6 $f_3$ and greater than that of the rear outer surface of the doublet which in turn is greater than .2 $f_3$.

23. An optical objective as claimed in claim 19, in which the divergent middle component of the rear member consists of a convergent element in front of a divergent element, the internal contact surface being dispersive and concave to the front and having a radius of curvature between .6 $f_3$ and 1.2 $f_3$, the mean refractive index of the material of the divergent element exceeding that of the convergent element by between .1 and .2.

24. An optical objective as claimed in claim 23, in which the divergent middle component of the rear member consists of a meniscus doublet, whose internal contact surface is concave to the front and whose front outer surface has radius of curvature less than .6 $f_3$ and greater than that of the rear outer surface of the doublet which in turn is greater than .2 $f_3$.

25. An optical objective as claimed in claim 19, in which the front and second members each consist of a doublet chromatically but not otherwise corrected and having its internal contact surface concave to the front, such surface being dispersive in the front member and collective in the second member.

26. An optical objective as claimed in claim 19, in which the equivalent focal length $f_3$ of the stationary rear member lies between $F_0$ and $\sqrt{F_0 F_m}$, where $F_0$ and $F_m$ are respectively the lower and upper limits of the range of variation of the equivalent focal length of the objective, and the ratio of the equivalent focal length $f_1$ of the convergent front member to that $f_2$ of the divergent second member lies between 1.0 and 1.2 times the value of the expression $(1+\sqrt{F_m F_0})$.

27. An optical objective as claimed in claim 19, in which the diameter of the convergent front member lies between $.22\ f_1$ and $.36\ f_1$ and that of the divergent second member between $.22\ f_2$ and $.72\ f_2$, where $f_1$ and $f_2$ are the equivalent focal lengths respectively of the front and second members, such diameters being larger than is necessary to accommodate the full axial beam, so that the relative aperture of the objective is determined solely by the stationary rear member and the diaphragm located in or near such member and therefore remains constant throughout the range of variation.

28. An optical objective of variable focal length, corrected for spherical and chromatic aberrations, coma, astigmatism, field curvature and distortion throughout the range of variation, and comprising a stationary convergent rear member, an axially movable divergent second member located in front of the rear member, an axially movable convergent front member located in front of the second member, and means for axially moving the front member and the second member whereby in each operative position the equivalent focal length of the divergent combination of such two members bears to that of the complete objective a ratio between 8 and 13 times the reciprocal of the f/number of the objective and the virtual image of a distant object formed by such divergent combination has a constant axial position relatively to the stationary rear member throughout the range of variation of the equivalent focal length of the objective, the ratio of the equivalent focal length $f_3$ of the stationary rear member to the value $F_0$ of the equivalent focal length of the complete objective at the lower end of the range of variation thereof lying between one-third and one-sixth of the f/number of the objective.

29. An optical objective as claimed in claim 28, in which the diameter of the convergent front member lies between $.22\ f_1$ and $.36\ f_1$ and that of the divergent second member between $.22\ f_2$ and $.72\ f_2$, where $f_1$ and $f_2$ are the equivalent focal lengths respectively of the front and second members, such diameters being larger than is necessary to accommodate the full axial beam, so that the relative aperture of the objective is determined solely by the stationary rear member and the diaphragm located in or near such member and therefore remains constant throughout the range of variation.

30. An optical objective as claimed in claim 28, having means whereby the convergent front member can be moved independently of the other two members for focusing for near objects.

31. An optical objective of variable focal length, corrected for spherical and chromatic aberrations, coma, astigmatism, field curvature and distortion throughout the range of variation, and comprising a stationary convergent rear member, an axially movable divergent second member located in front of the rear member, an axially movable convergent front member located in front of the second member and consisting of a doublet chromatically but not otherwise corrected, the internal contact surface in such doublet being dispersive and concave to the front and having radius of curvature between $.3\ f_1$ and $.8\ f_1$ where $f_1$ is the equivalent focal length of such front member, the mean refractive index of the material of the rear element of such doublet exceeding that of the front element thereof by between .05 and .12, and means for axially moving the front member and the second member whereby in each operative position the equivalent focal length of the divergent combination of such two members bears to that of the complete objective a ratio between 8 and 13 times the reciprocal of the f/number of the objective and the virtual image of a distant object formed by such divergent combination has a constant axial position relatively to the stationary rear member throughout the range of variation of the equivalent focal length of the objective.

32. An optical objective as claimed in claim 31, in which the divergent second member consists of a doublet chromatically but not otherwise corrected, the internal contact surface in such doublet being collective and concave to the front and having radius of curvature between $.25\ f_2$ and $.7\ f_2$ where $f_2$ is the equivalent focal length of such second member, the mean refractive index of the material of the front element of such doublet exceeding that of the rear element thereof by between .05 and .12.

33. An optical objective of variable focal length, corrected for spherical and chromatic aberrations, coma, astigmatism, field curvature and distortion throughout the range of variation, and comprising a stationary convergent rear member, an axially movable divergent second member located in front of the rear member and consisting of a doublet chromatically but not otherwise corrected, the internal contact surface in such doublet being collective and concave to the front and having radius of curvature between $.25\ f_2$ and $.7\ f_2$ where $f_2$ is the equivalent focal length of such second member, the mean refractive index of the material of the front element of such doublet exceeding that of the rear element thereof by between .05 and .12, an axially movable convergent front member located in front of the second member, and means for axially moving the front member and the second member whereby in each operative position the equivalent focal length of the divergent combination of such two members bears to that of the complete objective a ratio between 8 and 13 times the reciprocal of the f/number of the objective and the virtual image of a distant object formed by such divergent combination has a constant axial position relatively to the stationary rear member throughout the range of variation of the equivalent focal length of the objective.

GORDON HENRY COOK.

References Cited in the file of this patent

UNITED STATES PATENTS

| Number | Name | Date |
|---|---|---|
| 2,130,347 | Holst et al. | Sept. 20, 1938 |
| 2,159,394 | Mellor et al. | May 23, 1939 |
| 2,165,341 | Capstaff et al. | July 11, 1939 |
| 2,235,364 | Gramatzki | Mar. 18, 1941 |
| 2,353,565 | Kaprelian | July 11, 1944 |
| 2,514,239 | Hopkins | July 4, 1950 |